(12) United States Patent
Senarath et al.

(10) Patent No.: US 8,503,299 B2
(45) Date of Patent: Aug. 6, 2013

(54) METHOD AND SYSTEM FOR PACKET SCHEDULING

(75) Inventors: Nimal Senarath, Ottawa (CA); Paul Coverdale, Ottawa (CA); Hongyi Li, Ottawa (CA); Shalini Periyalwar, Ottawa (CA); Koon Hoo Teo, Ottawa (CA)

(73) Assignee: Apple, Inc., Cupertino, CA (US)

( * ) Notice: Subject to any disclaimer, the term of this patent is extended or adjusted under 35 U.S.C. 154(b) by 518 days.

(21) Appl. No.: 11/432,476

(22) Filed: May 12, 2006

(65) Prior Publication Data

US 2007/0019552 A1 Jan. 25, 2007

Related U.S. Application Data

(60) Provisional application No. 60/680,453, filed on May 12, 2005.

(51) Int. Cl.
*G01R 31/08* (2006.01)

(52) U.S. Cl.
USPC .......................................................... 370/235

(58) Field of Classification Search
USPC .......................................................... 370/235
See application file for complete search history.

(56) References Cited

U.S. PATENT DOCUMENTS

| | | |
|---|---|---|
| 5,394,433 A | 2/1995 | Bantz et al. |
| 5,898,679 A | 4/1999 | Brederveld et al. |
| 5,936,964 A * | 8/1999 | Valko et al. ................. 370/468 |
| 6,259,677 B1 * | 7/2001 | Jain ............................. 370/252 |
| 6,351,643 B1 | 2/2002 | Haartsen |
| 6,430,160 B1 * | 8/2002 | Smith et al. .................. 370/252 |
| 6,480,505 B1 | 11/2002 | Johansson et al. |
| 6,501,785 B1 | 12/2002 | Chang et al. |
| 6,526,279 B1 | 2/2003 | Dent |
| 6,549,784 B1 | 4/2003 | Kostic et al. |
| 6,567,415 B1 * | 5/2003 | Elwalid et al. ............... 370/412 |
| 6,574,223 B1 | 6/2003 | Brueckheimer et al. |
| 6,590,928 B1 | 7/2003 | Haartsen |
| 6,647,053 B1 | 11/2003 | Garces |
| 6,751,194 B1 * | 6/2004 | Ueno .......................... 370/235 |
| 6,771,598 B1 * | 8/2004 | Andrews ...................... 370/230 |
| 6,804,521 B2 | 10/2004 | Tong et al. |
| 6,826,409 B2 | 11/2004 | Kostic et al. |

(Continued)

OTHER PUBLICATIONS

Bolukbasi et al. "On the Capacity of Cellular Fixed Relay Networks", CCECE 2004, Niagara Falls, May 2004, pp. 2217-2220.

(Continued)

*Primary Examiner* — Mark Rinehart
*Assistant Examiner* — Peter Cheng
(74) *Attorney, Agent, or Firm* — Meyertons, Hood, Kivlin, Kowert & Goetzel, P.C.; Eric B. Meyertons

(57) ABSTRACT

A method and system for packet scheduling are provided. The method includes: the step of receiving an incoming packet; extracting packet identification information associated with the incoming packet, and assessing a delay budget for the incoming packet in dependence upon its arrival time and the associated information. The system includes: an input module for receiving an incoming packet, and extracting information associated with the incoming packet, and a module for assessing a delay budget for the incoming packet in dependence upon its arrival time and the associated information.

26 Claims, 15 Drawing Sheets

U.S. PATENT DOCUMENTS

| | | |
|---|---|---|
| 7,006,823 B2 | 2/2006 | Shurvinton et al. |
| 7,218,891 B2 | 5/2007 | Periyalwar et al. |
| 7,333,514 B2 | 2/2008 | Anehem et al. |
| 7,453,832 B2 | 11/2008 | Steer et al. |
| 7,590,064 B1 | 9/2009 | Zhang et al. |
| 7,646,752 B1 | 1/2010 | Periyalwar et al. |
| 7,962,095 B2 | 6/2011 | Periyalwar et al. |
| 2002/0141452 A1* | 10/2002 | Mauritz et al. ............... 370/503 |
| 2002/0154607 A1 | 10/2002 | Forstadius et al. |
| 2002/0167911 A1* | 11/2002 | Hickey ........................ 370/252 |
| 2005/0185651 A1* | 8/2005 | Rinne ........................ 370/395.1 |
| 2005/0281278 A1* | 12/2005 | Black et al. ................. 370/412 |
| 2006/0239204 A1* | 10/2006 | Bordonaro et al. ........... 370/253 |
| 2007/0089147 A1* | 4/2007 | Urdang et al. ................ 725/90 |
| 2008/0260000 A1 | 10/2008 | Periyalwar et al. |

OTHER PUBLICATIONS

Yang, "Asynchronous Fast Frequency-Hopping CDMA Cellular Systems", IEEE Transactions on Vehicular Technology, vol. 45, No. 4, Nov. 1996, pp. 676-682.

U.S. Patent and Trademark Office, "Communication" for co-pending U.S. Appl. No. 11/664,135, mailed Jun. 11, 2010, available in USPTO Patent Application Information Retrieval database.

U.S. Patent and Trademark Office, "Communiation" for co-pending U.S. Appl. No. 11/664,135, mailed Dec. 30, 2010, available in USPTO Patent Application Information Retrieval database.

U.S. Patent and Trademark Office, "Communication" for co-pending U.S. Appl. No. 11/664,135, mailed Mar. 29, 2012, available in USPTO Patent Application Information Retrieval database.

* cited by examiner

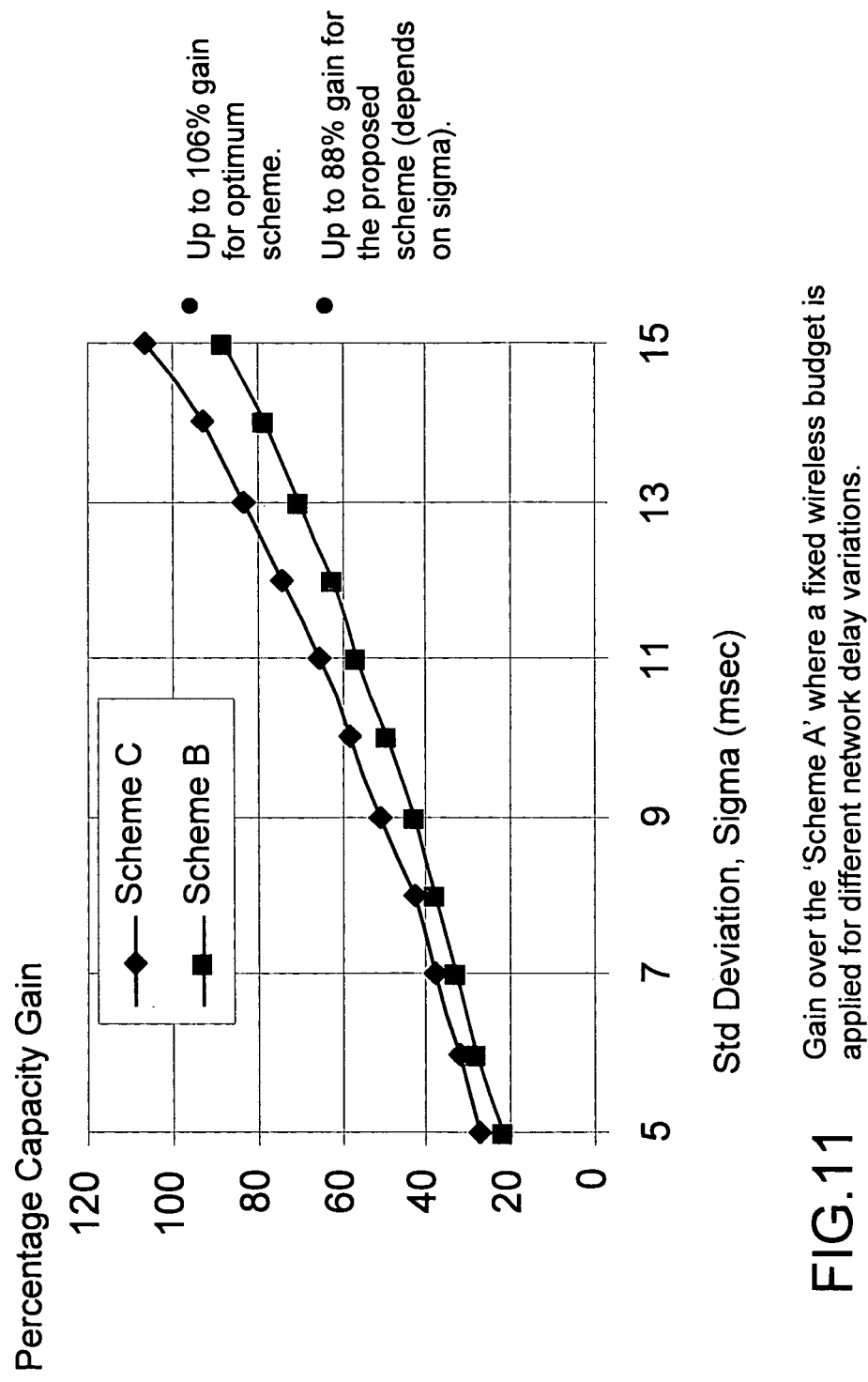
FIG. 11  Gain over the 'Scheme A' where a fixed wireless budget is applied for different network delay variations.

METHOD AND SYSTEM FOR PACKET SCHEDULING

FIELD OF INVENTION

The present invention relates to network communications, more specifically to scheduling packets for the network communications.

BACKGROUND OF THE INVENTION

As is well known in the art, wireless packet communications services, such as HyperText Transfer Protocol (http), voice over IP or video streaming, require that packets are received by a destination device within a certain time limit (referred to as a delay budget). For example, one widely accepted delay for voice services (e.g., voice over IP) is 200 ms. In order to meet this end-to-end delay requirement, the access points (for example base stations) to which the destination node is connected need to meet a certain delay limit based on a per flow basis. One problem, however, is that the delay experienced by a packet as a result of being transmitted from a source (e.g., a computer) to an access point over a network (e.g., the Internet) is unknown. Currently this external network delay is accounted for by assuming a worst case scenario (e.g., 150 ms) or assuming a certain requirement for the delay statistics for all the users and packets. For purposes of scheduling packets for transmission over the wireless link to a destination device, the worst case scenario approach sets the delay budget in the access point to the difference between the total acceptable delay for a given data flow and the external network delay (e.g., 50 ms). Some packets may arrive at a receiver side earlier than the delay limit. For the streaming services, however, there is an additional requirement that data packets be delivered to the destination in regular time intervals. This is currently addressed by having a jitter buffer to deliver the packets in order and in regular intervals by delaying the packets arrived earlier. This results in an inefficient use of resources at the access point and impacts capacity of the wireless access system significantly.

FIG. 1 illustrates a conventional commutations network system which utilizes a fixed delay budget scheme. Referring to FIG. 1, a node 4 is connected to a wireless node 6, such as a wireless edge router, a base station controller (BSC) and a base station (BS), through a wireless link. End users (source) 8 are connected to the wireless node 6 through a network 10 (e.g., the Internet). The network 10 may be a wireless network or a wireline network. Network delay Y0 for the network 10 depends on where end user/host located what network he/she/it is connected to, traffic congestion etc, and changes with time. Nevertheless, a fixed wireless delay budget Z0 for the link between the node 4 and the wireless node 6 is set as Z0=D-Ymax where D is an end-to-end delay requirement and Ymax is a network delay for the worst case scenario.

This impacts capacity significantly since packets which arrive earlier than the budgeted time are also sent with the smallest target delay (hence a larger amount of resources). For example, in order to meet an end-to-end delay budget of 200 msec, a tight over the air scheduling delay budget of 50 msec may be required for each packet, if the worst case total delay over the network and over the backhaul (including framing delays) is assumed to be 150 msec.

Therefore, it is desirable to provide a method and system for scheduling packets, which is enable to efficiently use resources and capacity of a network.

SUMMARY OF THE INVENTION

It is an object of the invention to provide a method and system that obviates or mitigates at least one of the disadvantages of existing systems.

In accordance with an aspect of the present invention, there is provided a method of packet scheduling. The method includes the steps of: receiving an incoming packet; extracting information associated with the incoming packet; and assessing a delay budget for the incoming packet in dependence upon its arrival time and the associated information.

In accordance with a further aspect of the present invention, there is provided a system for packet scheduling. The system includes: an input module for receiving an incoming packet, and extracting information associated with the incoming packet; a module for assessing a delay budget for the incoming packet in dependence upon its arrival time and the associated information; and an output module for outputting the delay budget.

In accordance with a further aspect of the present invention, there is provided a computer readable medium having computer-executable instructions for packet scheduling, which includes: receiving an incoming packet; extracting information associated with the incoming packet; and assessing a delay budget for the incoming packet in dependence upon its arrival time and the associated information.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 11 illustrates the performance results of FIG. 10, relative to that of Scheme A;

DETAILED DESCRIPTION

Figure 2:
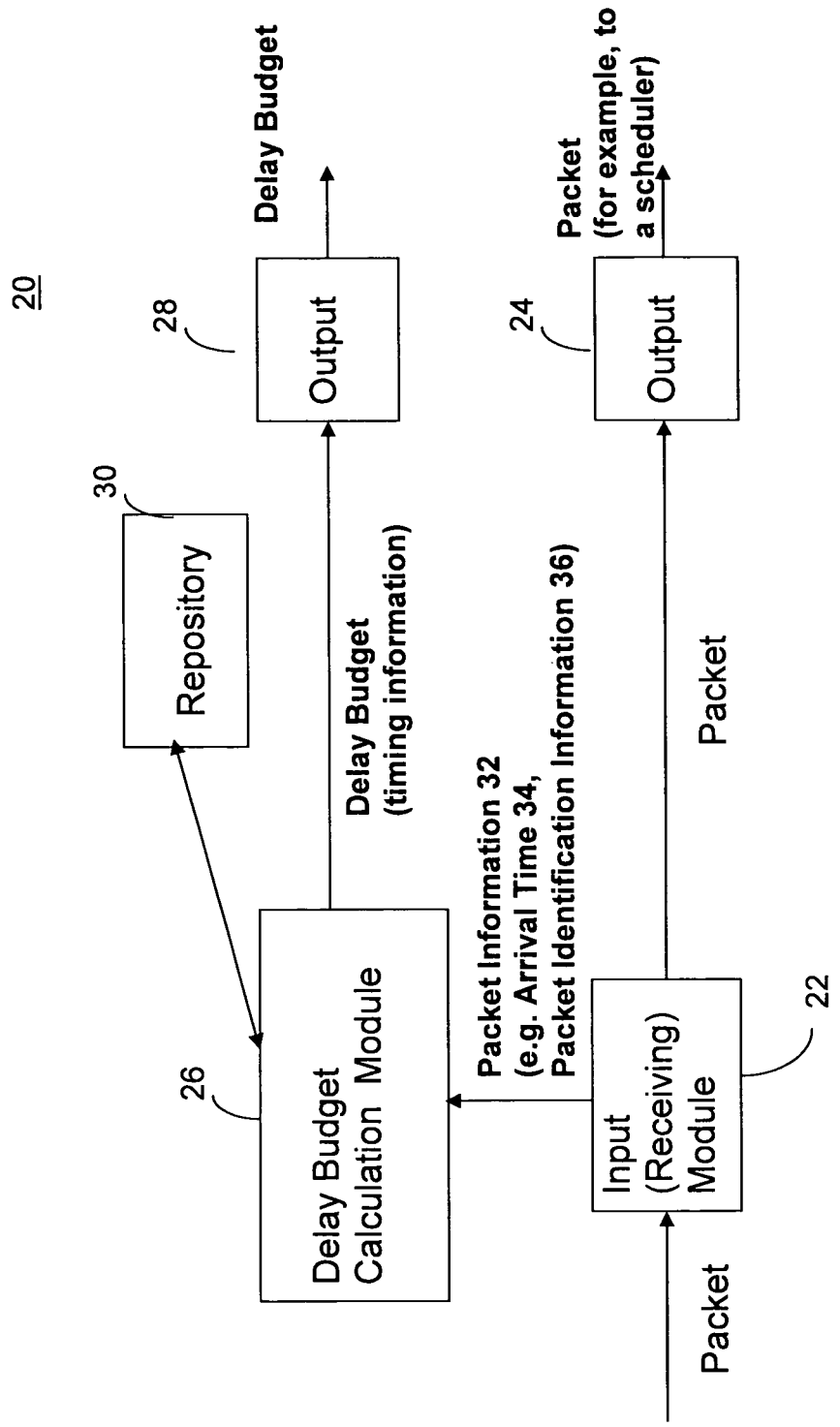
FIG. 2 illustrates an example of a packet analyzer, in accordance with an embodiment of the present invention.

Referring to FIG. 2, an example of a packet analyzer 20, in accordance with an embodiment of the present invention is described. An input module 22 receives a packet. The input module 22 records or notes an arrival time 34 of the received packet, and extracts packet identification information 36 from the received packet. An output module 24 outputs (or sends) the packet received at the input node 22. A delay budget calculation module 26 receives packet information 32 from the input module 22 and calculates a delay budget. An output module 28 outputs the delay budget information provided from the delay budget calculation module 26.

The packet information 32 obtained by the input module 22 and provided to the delay budget calculation module 26 includes the arrival time 34 of the packet, and the packet identification information 36 extracted from the packet. The packet identification information 36 may associate or relate the packet to a user, a service, one or more flows, one or more previously received packets, or combinations thereof. In the description, "past packet(s)", "previously received packet(s)", and "already arrived packet(s)" may be used interchangeably.

The delay budget calculation module 26 may include a statistic analysis module for statistically analyzing the arrival time 34 of a packet. The statistic analysis module may, for example, but not limited to, evaluate an expected arrival time of the packet based on an arrival time distribution of the previously received packets or Cumulative Distribution Function (CDF). The statistic data produced by the statistic analysis module may be updated every time a packet is analyzed or in a certain interval. The statistic data may be updated until it becomes stable, and then is used to assess the delay budget.

The packet analyzer 20 may include a repository 30 which stores information for calculating the delay budget, such as arrival times 34 of packets, packet identification information 36, previously received packets information, statistic data for the analysis of arrival times, known or calculated delay distribution, and calculated delay budgets. The packet analyzer 20 keeps track of information of incoming packets using the repository 30. The repository 30 may include a look up table in which an expected time of arrival may be stored. Based on the information on the repository 30, the delay budget calculation module 26 may iteratively assess the delay budget each time another packet is received.

The input module 22 may include a module for noting the arrival time 34 of the packet or a module for recording the arrival time 34 of the packet, and a module for extracting the packet identification information 36 of the packet. In the description, "record (recording)", "note (noting)", and "obtain (obtaining)" may be used interchangeably. The recording or noting module may be provided separately from the extracting module. The packet analyzer 20 may include a module for marking an arrival time of a packet. The marking module may mark the arrival time by, for example, a timer or some software modification. The marking module may be included in the input module 22 or the delay budget calculation module 26.

The packet analyzer 20 may include a controller (not shown) for controlling the input module 22, the output modules 24 and 28, the delay budget calculation module 26, or combinations thereof. The controller may control the delay budget calculation, select a packet for the calculation, control a timing of outputting the packet/delay budget, control the repository 30 to store and manage information (e.g., arrival time 34, packet identification information 36, calculated results, statistic data, etc.) in the repository 30, control the marking module, control the noting module, or combinations thereof. The controller may be provided separately from the packet analyzer 20.

The packet analyzer 20 may be implemented by any hardware, software or a combination of hardware and software having the above described functions. The controller described above may be implemented by any hardware, software or a combination of hardware and software having the above described functions.

The packet analyzer 20 may be provided to an intermediate node in a network for streaming services. The delay budget may be the maximum duration to which the incoming packet can be delayed in one or more next forwarding nodes and associated links, until it reaches a destination, without impacting the required quality of a service. Using the packet analyzer 20, the packet is delivered from a source to its destination in a dynamically assigned timing.

It is noted that in the description, "delay budget", "delay target" and "timing information" may be used interchangeably. It is noted that in the description, "calculate (calculation)", "estimate (estimation)", "evaluate (evaluation)", and "assess (assessment)" may be used interchangeably.

In FIG. 2, the output module 28 is provided separately from the output module 24. However, as shown in FIG. 3, the output module 24 may output a packet with a calculated delay budget.

Figure 3:
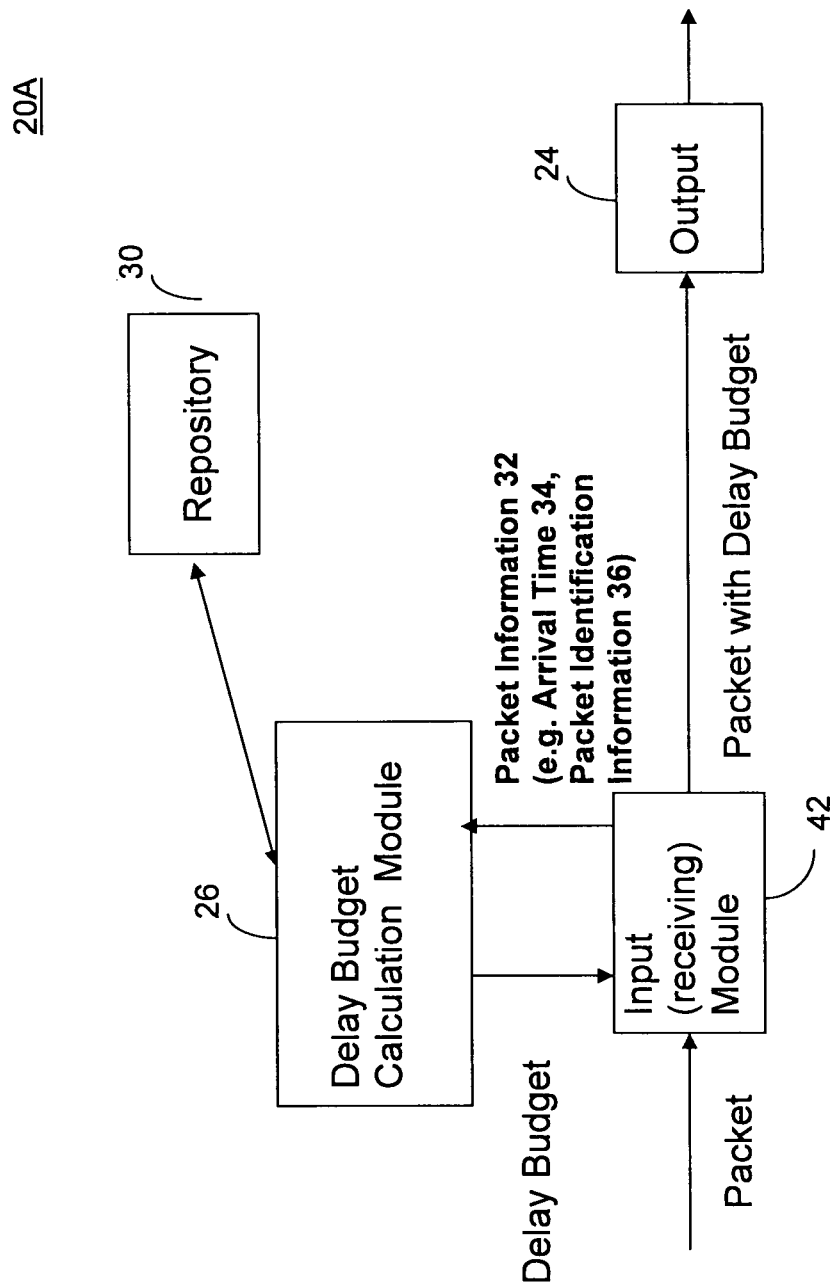
FIG. 3 illustrates an another example of a packet analyzer, in accordance with an embodiment of the present invention.

Referring to FIG. 3, another example of a packet analyzer 20A, in accordance with an embodiment of the present invention is described. An input module 42 is similar to the input module 22 of FIG. 2. The input module 42 receives a packet, records or notes the arrival time 34 of the packet, and extracts the packet identification information 36 from the received packet. A delay budget calculation module 26 receives the packet information 32 from the input module 42 and calculates the delay budget. The delay budget information is provided to the input module 42. The input module 42 further includes a module for attaching the delay budget information provided from the delay budget calculation module 26 to the packet or an incoming packet. The delay budget information may be included in a header of the packet. The output module 24 outputs the packet with the delay budget information output from the input module 42.

The input module 42 may include a module for noting the arrival time 34 or a module for recording the arrival time 34, separately from a module for extracting the packet identification information 36. The packet analyzer 20A may include the marking module, as described above.

The packet analyzer 20A may be implemented by any hardware, software or a combination of hardware and software having the above described functions. The packet analyzer 20A may include a controller (not shown) for controlling the input module 42, the output module 24, the delay budget calculation module 26, or combinations thereof. As described above, the controller may control the delay calculation, select a packet for the calculation, control a timing of outputting the packet/delay budget, control the repository 30 to store and manage information (e.g., arrival time 34, packet identification information 36, calculation results, statistic data, etc) in the repository 30, control the marking module, control the noting module, or combinations thereof. The controller may be provided separately from the packet analyzer 20A. The packet analyzer 20A may include a module for marking or noting an arrival time of a packet.

Figure 4:
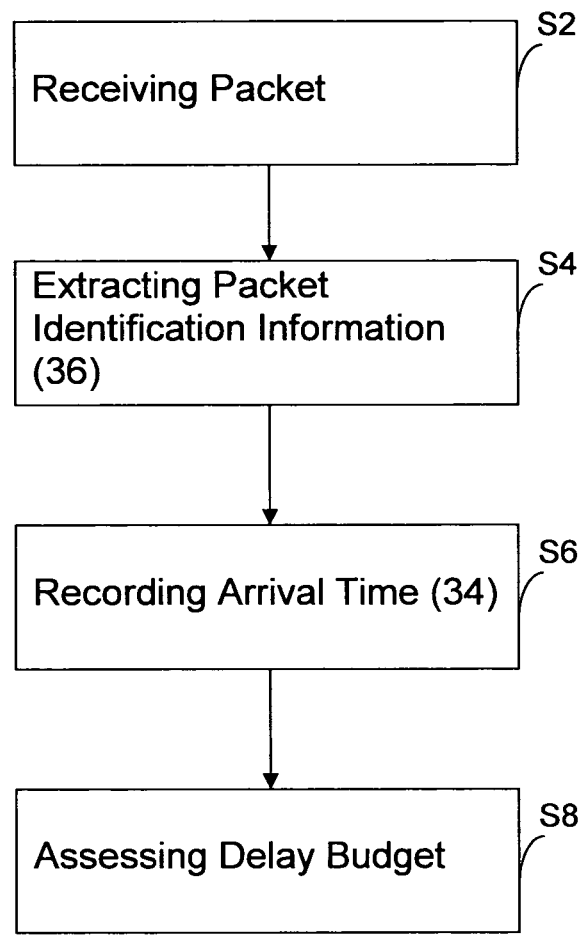
FIG. 4 illustrates in a flowchart an example of a method of packet scheduling in accordance with an embodiment of the packet analyzer.

FIG. 4 illustrates in a flowchart an example of a method of packet scheduling in accordance with an embodiment of the packet analyzer 20 of FIG. 2. The packet analyzer 20 receives a packet (S2). The packet analyzer 20 extracts the packet identification information 36 of the packet, such as information relating the packet to a user, a service, one or more flows, one or more previously received packets (S4). The packet analyzer 20 records/notes the arrival time 34 of the packet (S6). The packet analyzer 20 assesses a delay budget (S8). The packet analyzer 20 may use an expected arrival time for the assessment for the next hop. The expected arrival time may be stored in a repository (e.g., 30 of FIG. 2). The extracting step S4 may be performed after the recording/noting step S6. The operation illustrated in FIG. 4 is applicable to the packet analyzer 20A of FIG. 3.

Figure 5:
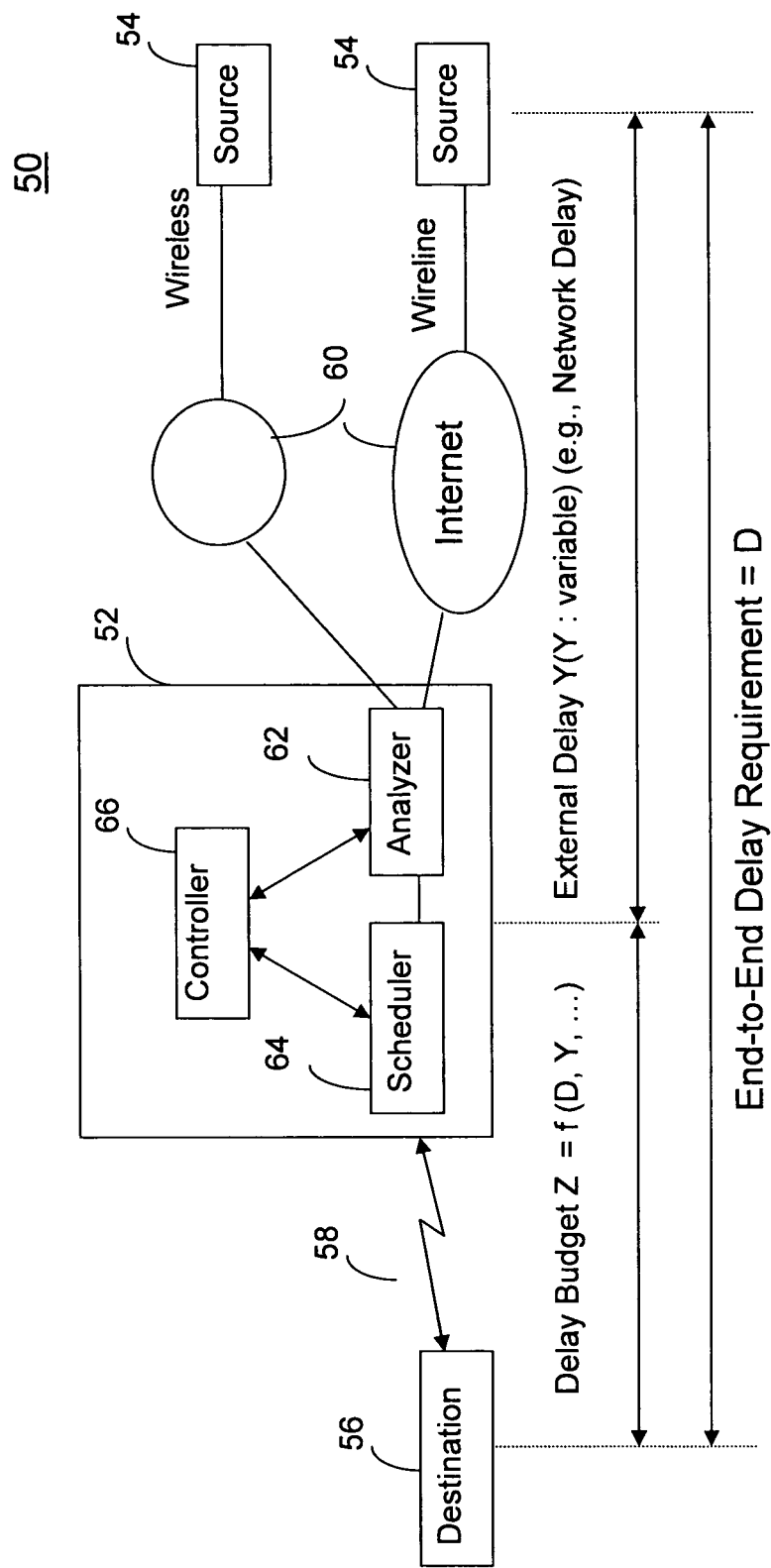
FIG. 5 illustrates a communications network system to which the packet analyzers of FIG. 2 and 3 are applicable.

FIG. 5 illustrates a communications network system 50 to which the packet analyzers of FIGS. 2 and 3 are applied. The commutations network system 50 provides streaming services. The communications network system 50 includes an access point 52 for connecting a source node 54 and a destination node 56. The destination node 56 communicates with the access point 52 through a wireless network 58. The source node 54 communicates with the access point 52 through an external network 60. Packets received at the access point 52 from the source 54 may be forwarded to the destination node 56 or an intermediate node depending on their arrival patterns. Source coding may be done at the source 54 in a regular interval.

The commutations network system 50 provides, for example, packet based streaming services, such as VoIP, where regular resources are not reserved for individual users in the wireless network 58. A variety of commutations standard may be applied to the communications network system 50, and may include, but not limited to, 1×EV/DO, 1×EV/DV, UMTS, HSDPA, IEEE 802.16 and IEEE 802.11 standards.

In FIG. 5, one access point 52 is shown as an example. However, the communications network system 50 may include more than one access point between the source node 54 and the destination node 56. In FIG. 5, one destination 56 is show as an example. However, the communications network system 50 may include more than one destination nodes. In FIG. 5, the external network 60 includes one wireline network and one wireless network. However, the external network 60 may include one or more than one wireline network, one or more than one wireless network, or combinations thereof.

In the description below, the terms "source" and "source node" may be used interchangeably. In the description below, "source" and "destination node" may include transmitting and receiving circuitry, and "source" and "destination node" may implement two-way communications.

The source 54 may include a user equipment (UE), such as a computer. The destination node 56 may include a mobile terminal, such as, but not limited to, a pager, cellular phone, and a voice and video contents download device. The destination node 56 may be in a cell. The cell may include a base transceiver station (BTS).

The access point 52 includes a packet analyzer 62, a scheduler 64 and a controller 66. The packet analyzer 62 is an ingress point of the wireless node. The packet analyzer 62 includes the packet analyzer 20 of FIG. 2 or 20A of FIG. 3. The packet analyzer 62 analyzes one or more packets provided from the source 54 to the destination node 56, and dynamically assesses a delay budget Z to deliver a packet to the destination node 56 from the access point 52. The delay budget Z is a target delay for the downlink. In FIG. 5, the wireless network 58 is shown as an example of the downlink. However, the downlink may include a wireline network. The delay target Z is a delay for the incoming packet for one or more wireless or wireline hops that the incoming packet travel until it reaches its destination 56. The delay budget Z may be a delay for the incoming packet, which the communications system 50 can allow in one or more next forwarding nodes and associated links, until it reaches its destination 56, without impacting the required quality of a service. The delay budget Z may be dynamically determined to increase throughput. The packet analyzer 62 may pass incoming packets without processing the packets.

The scheduler 64 sends, to the destination 56, packets output from the packet analyzer 62 based on the delay budget Z. The scheduler 64 may add, to the delay budget Z, any other rules or requirements to adjust the delay budget Z. The scheduler 64 may prioritize and arbitrate the departure of the packets.

The controller 66 controls the packet analyzer 62, the scheduler 64, or a combination thereof. The controller 66 may control the delay budget calculation, select a packet for the calculation, control a timing of outputting the packet delay budget, control the repository 30 to store and manage information, e.g., arrival time (34 of FIGS. 2-3), packet identification information (36 of FIGS. 2-3), calculated results, statistic data, etc., in a repository (e.g., 30 of FIGS. 2-3), or combinations thereof. The repository may be in the packet analyzer 62, the controller 66 or may be provided separately from the packet analyzer 62 and the controller 66.

In FIG. 5, the packet analyzer 62 is provided or integrated in the access point 52. However, the packet analyzer 62 may be located separately from the access point 52. A module for recording/noting the arrival time (e.g.,34 of FIGS. 2-3) of a packet, a module for extracting the packet identification information (e.g.,36 of FIGS. 2-3), a module for analyzing packets, and a module for assessing the delay budget Z may be located separately. For example, the module for assessing the delay budget Z may be in the access point 52 apart from the packet analyzer 62, and may be in the controller 66. The packet analyzer 62 may be implemented by any hardware, software or a combination of hardware and software having the above described functions.

In FIG. 5, the controller 66 is provided separately from the packet analyzer 62. However, the controller 66 may be in the packet analyzer 62 or be integrated into the packet analyzer 62. Further, the controller 66 may be provided separately from the access point 52. The controller 66 may be implemented by any hardware, software or a combination of hardware and software having the above described functions.

The access point 52 may include, but not limited to, a wireless edge router, a base station (BS), a base station controller (BSC), a relay, an ad-hoc terminals relay, a wireless forwarding node including a mesh network node, or combination thereof. The access point 52 may be an Orthogonal Frequency Division Multiplexing (OFDM) based system, which uses L2 transmissions. The scheduler 64 may be a Signal-to-Interference (C/I) and Delay based scheduler.

The packets to be scheduled and/or to be analyzed at the access point 52 may include voice packets, video packets, or combination thereof. The packets may include streaming packets. A sequence number may be provided to each packet, which indicates the non-availability of the packet.

The packet analyzer 62 assesses an external delay (e.g. network delay) Y. The external delay Y is a variable delay caused in a communication path from the source 54 to the node which would forward it to the destination or to another forwarding node. The external delay Y may be a network delay due to the network 60. In the description, "external delay" and "network delay" may be used interchangeably. In the communications network system 50, the delay budget Z is determined by a function of the variable external delay Y.

The delay budget Z may be estimated as Z=D-Y. The delay budget D may be estimated as Z=D-Y-C where "C" is a known fixed delay and/or any adjustable parameters other than those calculated by the packet analyzer 62. "C" may be a wireless fixed delay in the wireless communication (F1), a wireline fixed delay in the wireline communication of the external network 60 (F2) or a combination thereof. The wireless fixed delay in the wireless communication (F1) may include a wireless fixed delay in the wireless network 58, a wireless fixed delay in the external network 60, or a combination thereof.

Wireless system capacity is highly dependent on its delay requirement. However, the wireless downlink delay budget in the conventional systems has to be set so as to allow for the worse delay situation in the network. This limits the wireless delay budget and impacts capacity. By contrast, the change of the delay budget Z allows the system to efficiently utilize a network capacity.

Figure 6:
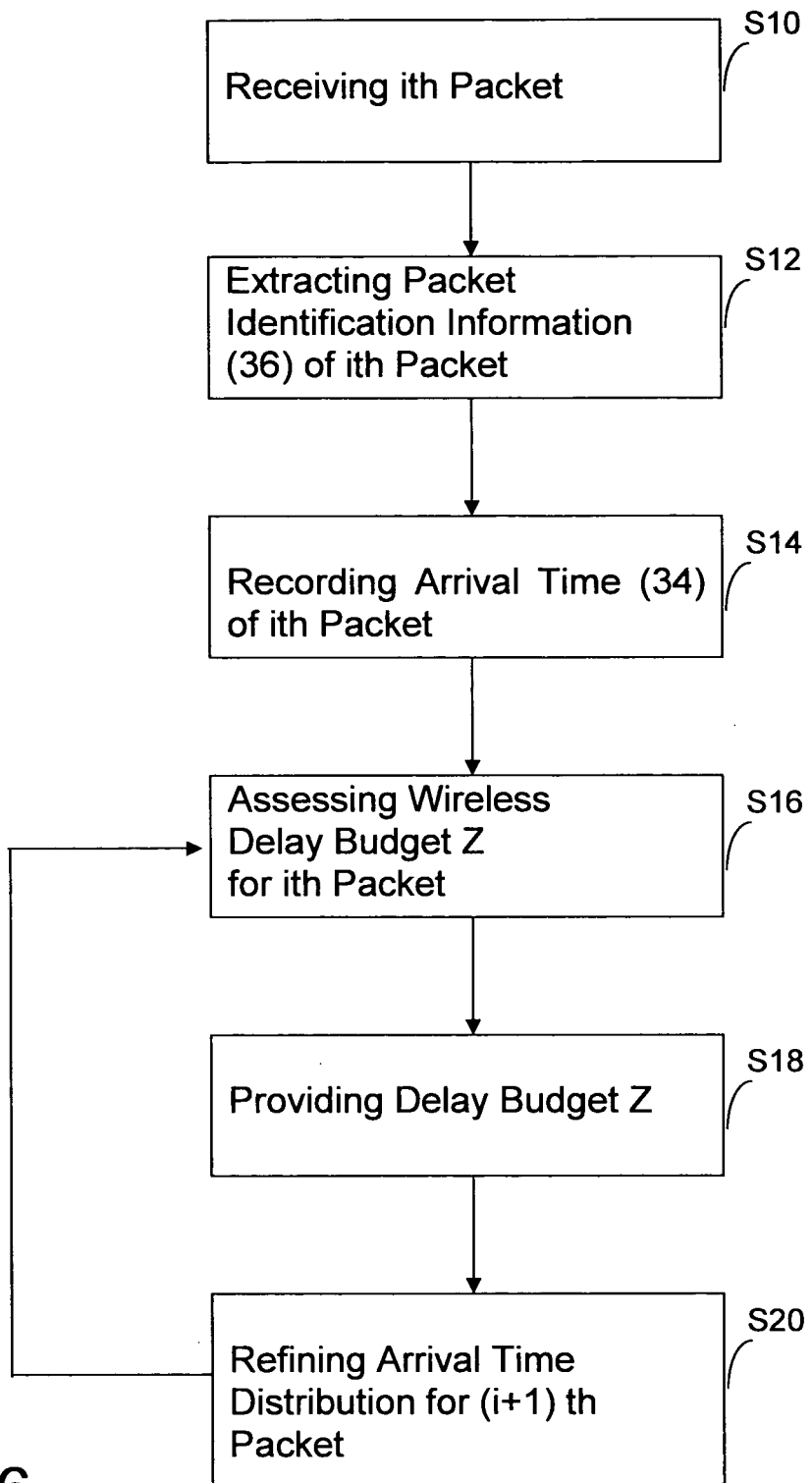
FIG. 6 illustrates in a flowchart an example of a method of packet scheduling by an access point of FIG. 5.

The operation flow of FIG. 4 is applicable to that of the packet analyzer 62. Further, FIG. 6 illustrates in a flowchart an example of a method of packet scheduling by the access point 52. Referring to FIG. 6, for each packet arrived and until session is over, the access point 52 receives a packet from the external network 60 (S10). The packet analyzer 62 extracts packet identification information (e.g., 36 of FIGS. 2-3), such as information relating the packet to a user, a service, one or more flows, and one or more previously received packets (S12). The packet analyzer 62 records/notes the arrival time (e.g., 34 of FIGS. 2-3) of the packet (S14). The packet analyzer 62 assesses a delay budget Z for the next wireless hop using, for example, statistics of an expected arrival time (S16). The expected arrival time statistics may be evaluated by the arrival time distribution of the previously received packets. For a given packet, the target delay budget is evaluated based on the confidence level of the estimated delay window for the associated data flow/user/service. The packet analyzer 62 provides the delay budget Z to the scheduler 64 to schedule the packet (S18). Then the packet analyzer 62 refines the statistic data, such as, the arrival time distribution of the already arrived packets, and refines the delay window the next packet arrives using the arrival time 34 of the current packet (S20). The arrival time 34 of the current packet can be used to evaluate the target delay budget of the next packet to be arrived.

The operation steps S12, S14, S18, S20 or combinations thereof may be implemented by the controller 66. The extracting step S12 may be performed after the recording/noting step S14. The arrival time may be marked or noted during the process of FIG. 6.

In the description, "arrival distribution" and "delay distribution" may be used interchangeably. The arrival time distribution may be used after a certain learning or updating time as described below. Initially, the delay budget may be assigned using any schemes other than the arrival delay distribution, as described below. For a first packet, the maximum delay budget (for example, budget for the worst case, may be assigned.

Figure 7:
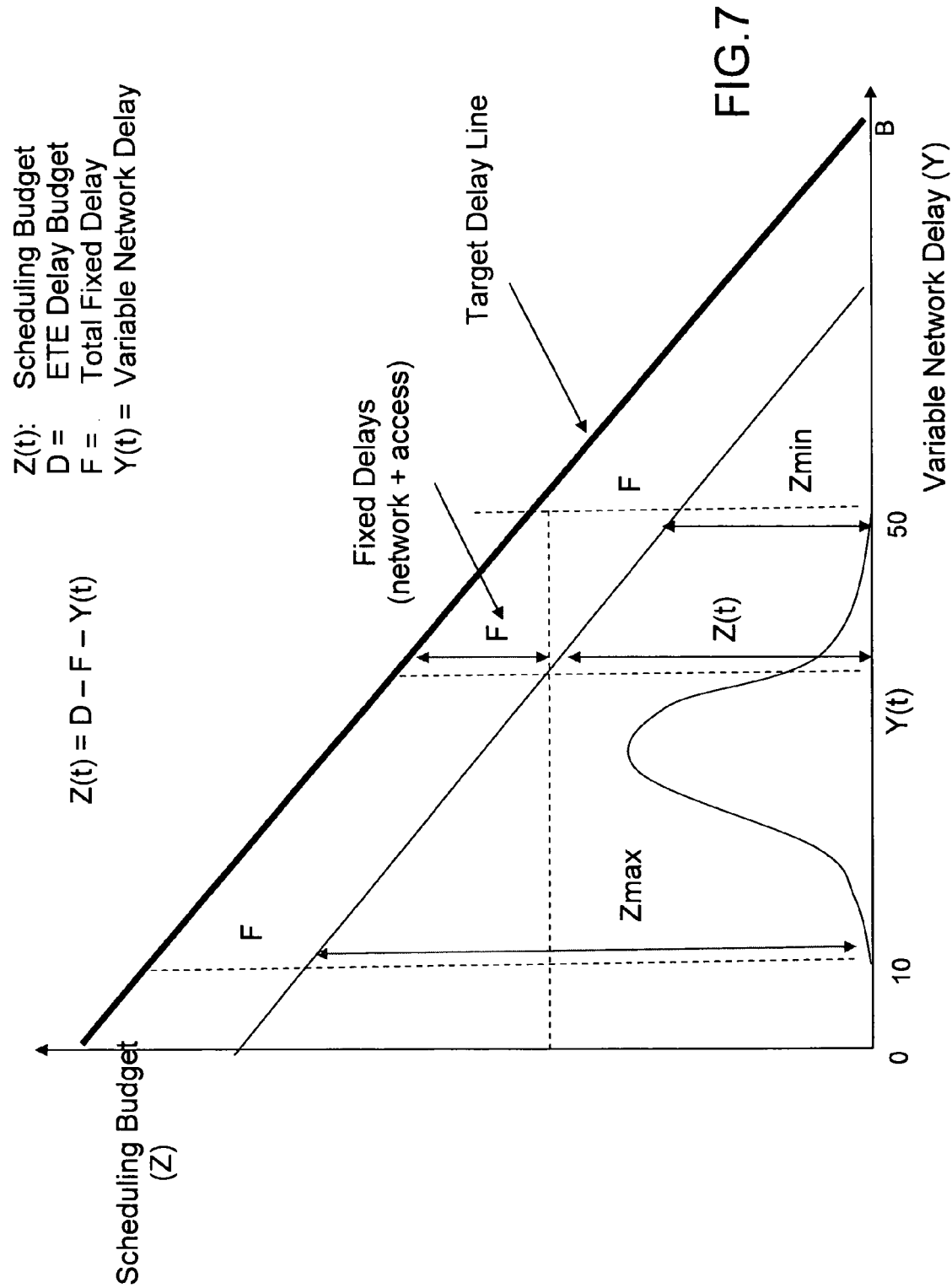
FIG. 7 illustrates an example of a variable delay budget in the communications network system of FIG. 5.

FIG. 7 illustrates an example of a variable delay budget by the packet analyzer 62 of FIG. 5. In FIG. 7, "Z(t)" represents a scheduling budget which corresponds to "Z" of FIG. 5, "D" represents an end-to-end (ETE) budget which corresponds to "D" of FIG. 5, "F" represents a total fixed delay which is a known parameter, and "Y(t)" is a variable external delay (e.g., network delay) which corresponds to "Y" of FIG. 5. As shown in FIG. 7, the delay budget Z(t) is changed based on the variable network delay. Thus the delay budget Z may vary from Zmin to Zmax. When the delay budget Z is increased, there is an opportunity to wait and transmit when the channel conditions are favourable for transmission (during upfades of the fading of the changing channel), to do a re-transmission, or to send an urgent packet of another user during that time.

Referring to FIG. 5, the packet scheduling is described in detail. The access point 52 may implement a source-based or a user-based scheduling. Under the source or user-based scheduling, the packet analyzer 62 may assess the network delay Y and determines the delay budget Z on the user or source basis. The access point 52 may implement a flow-based scheduling. Under the flow-basis scheduling, the access point 52 may determine timing information for each of two or more than two data flows (e.g., voice and video).

The delay budget Z over the wireless access system may be determined on a packet-by-packet basis. The network delay over the wired network may be assessed using past packet information. The wireless systems do not reserve regular resources for individual users. Thus, the packet-based evaluation is applicable to packet based streaming services, such as VOIP.

In an example, the packet analyzer 62 analyzes an arrival time (e.g., 34 of FIGS. 2-3) of a packet that is granted (generated) on a regular time interval at the source 54 (e.g., voice and video applications) and assesses the network's relative delay. The packet analyzer 62 may evaluate the delay variation V which occurs over the incoming network 60 using relative arrival times, and evaluate the delay budget Z for each packet based on this delay variation information. The destination node 56, the access point 52, the packet analyzer 62 or the controller 66 may send a request to the source 54 to send packets in regular basis for the evaluation purpose.

In a further example, a dummy packet may be sent in a regular interval from the source 54. The dummy packet may be used to calculate the delay budget Z.

In a further example, the external delay Y may be assessed using a special control message which is sent from the source 54 to the access point 52 upon a request made by the access point 52 or the destination node 56. For example, a Packet Internet Groper (PING) message response time or round trip delay, T, may be used for evaluating the external delay Y. The packet analyzer 62 or the controller 66 sends a PING message to the source 54. When the packet analyzer 62 receives a PING response, the packet analyzer 62 assesses the external delay Y using T. In this case, the external delay Y may be determined by, for example, Y=T*α where α may be ½. The external delay Y may be determined by, for example, Y=T/2+β where β may be empirical data which reflects network delay characteristic.

In a further example, the delay budget Z may be estimated based on past packet information stored in a repository (e.g., 30 of FIGS. 2-3). The past packet information represents information associated with previously received one or more packets. Under this scheme, the delay budget Z is evaluated after a certain learning time.

Initial packets sent from the source 54 are used to evaluate a network delay characteristic of the external network 50. The statistic data, such as an arrival time distribution, may be generated based on the initial packets. After evaluating the arrival time distribution, the delay budget Z is estimated. The packet analyzer 62 may calculate an average of the arrival times of the previously received packets to calculate the network's relative delay.

In an example, the packet analyzer 62 utilizes the stored previously received packets information to estimate the arrival time distribution. After a certain learning time, the packet analyzer 62 assesses the external delay Y for a packet using the arrival time distribution For example, for voice packets a stable assessment may be reached after receiving approximately 30 packets of its data stream when the arrival time distribution is assumed to be normal distributed. Thus, the learning period will be quite small. However, even during learning period, as shown in example X described below, a conservative delay budget can be obtained based on the previous packet information to obtain delay margins in the delay budget.

The past packet information may be used to identify how much earlier a packet arrived by comparing it to the worst case delay budget for the external network 60. The packet analyzer 62 estimates the delay distribution based on the stored arrival times of past packets. Relative delay between two packets can be used to check which position it locates in the Cumulative Distribution Function (CDF) and therefore, estimate how early it arrived. It is noted that the packet analyzer 62 (or controller 66) may generate the CDF.

In a further example, the packet analyzer 62 utilizes a known delay distribution, which may be stored in the repository (e.g., 30 of FIGS. 2-3). The packet analyzer 62 assesses the delay budget based on the known delay distribution. If the delay distribution is not known or will be updated, the packet analyzer 62 calculates a new delay distribution based on already received packets. The new delay distribution may be stored in a repository (e.g. 30 of FIGS. 2-3). The new delay distribution may be updated every time a packet is analyzed or in a certain interval. The delay distribution may be updated until it becomes stable. Then the delay distribution may be used as the known delay distribution. Even before an accurate assessment of the delay distribution is obtained, a conservative and useful delay budget may still be calculated as shown in example X described below.

In a further example, the packet analyzer 62 may include a module for identifying an average delay estimate for an individual end user, one or more specific data flows of a user, a specific service, one or more previously received packets, or combinations thereof The packet identification information (e.g., 36 of FIGS. 2-3) may be used to identify the average delay estimate. If the source 54 is far away from the access point 52 (e.g., across several wireline networks), it would have a larger delay than the closer sources. The average identification module identifies this larger delay. The packet analyzer 62 may assign a larger delay budget over the wireless media to all the packets from the closer user. For example, the identification module may send a "ping" message and getting the time from which the delay can be estimated. The average identification module may be in the controller 66.

In a further example, the packet analyzer 62 may include an identification module for identifying the association with a plurality of data flows. For some service types, the different data flows are connected to each other (e.g., voice and video signals in a video conference). The association identification module identifies these connected data flows. The association identification module may be in the controller 66. The packet analyzer 62 assesses the delay budget Z for each data flow to provide a proper relationship between the timings of the data flows. For example, some data-flows may exhibit larger delay than other types. The association identification module identifies which voice packet is to be synchronized with which video packet. If two synchronized packets received in two different times from the same source, the packet analyzer 62 determines that they have experienced different delays. Thus, the packet analyzer 62 may provide a different delay budget to each other so as to establish the synchronization with each other at the destination node 56.

In a further example, a delay estimate may be used to allow a larger packet delay for users and/or their specific data flows whose packets do not experience a large external network delay. The identified data flows will be given a lower priority or scheduled at a later time than the other flows according to their delays.

In a further example, a delay estimate may be used to allow a larger packet delay for the individual packets, which do not experience a large external network delay.

In a further example, the packet analyzer 62 may implement time stamp based delay adjustment scheme. Under this scheme, packets are time-stamped at the source 54. The packet analyzer 62 looks at time stamps in packets from the source 54 during the learning time, and assesses the delay distribution. The destination node 56, the access point 52, the packet analyzer 62 or the controller 66 may send a request to the source 54 to time-stamp a certain packet for the evaluation purpose.

In a further example, the external delay Y may be evaluated per user using criteria associated with the communications between the source 54 and the destination node 56, such as the number of networks and the type of networks initial packets have gone through prior to reaching the access point 52.

In a further example, the network delay Y may be assessed and the delay budget Z may be evaluated using the packet information of other parallel related flows from the same source.

In a further example, the network delay Y may be assessed and the delay budget Z may be evaluated using the number of hops a packet has traveled.

In a further example, the above packet scheduling methods may be combined. The delay budget Z may be assessed, for example, by using a packet with a time stamp and a packet granted in regular basis without time. For example, if a time stamp is provided during the source packet generation, the time stamp is used to evaluate the delay requirements over the wireless hop. If such a time stamp is not available and if the packets are generated on a regular basis at the source 54, after the leaning period, the packet delay of individual packet may be assessed and the delay budget Z over the wireless link 58 may be set. If the time stamp is not available, the delay budget Z may be set based on the delay variation for each packet granted in a regular basis without any learning period.

As will be appreciated by one of originally skill in the art, there are several ways to estimate a delay between two nodes, such as sending a PING message or sending a request specifically requesting to time-stamp a certain packet.

In a further example, a nominal network delay from the source 54 to the wireless access point 52 is estimated per user using the number of networks and the type of networks the initial packets have gone through prior to reaching the access point. This initial nominal network delay is used to evaluate the Nominal wireless budget (e.g., Nominal wireless delay budget=ETE delay requirements−nominal network delay−conservative margin). The conservative margin may be used at the beginning in order to allow for the worst case network delay variation. This conservative margin may be known information, may be obtained by empirical results and may depend on the current technology being used by the wireline and wireless networks and the number of networks a packet has traveled.

In a further example, the packet analyzer (e.g. 20 of FIG. 2, 20A of FIG. 3, 62 of FIG. 5) may assign delay budgets Z for some packets conservatively, when staring scheduling, and then may assign a delay budget Z for further packets more aggressively, since the packet analyzer obtains more accurate information for analyzing the arrival time of these further packets. For example, the packet analyzer may assign a certain delay budget Z for a first packet (for example, a maximum delay), and store the packet information of the first packet. The packet analyzer may assign a delay budget Z for a next packet using the above packet scheduling methods, such as, but not limited to, an average of the arrival times, and may update statistic data or analyzed data (e.g. delay distribution). After a certain learning time, the packet analyzer may assign a delay budget for a further next packet using a delay distribution based on a plurality of previously received incoming packets that have been received during the learning time.

In the above description, the delay budget for the downlink transmission is described. In a further example, the nominal network delay for the uplink transmission from a wireless network may be estimated at the access point 52, using the approaches described above at the initial phase of a communication session and uses that estimate to establish an uplink over the air delay budget for a given data flow. For the uplink, however, a packet by packet delay setting may not occur but a target delay requirement can be set per or a user on a per flow basis using one of the approaches described above (e.g., number of network nodes and the type of networks to be passed to go to a given destination, identification of the destination address as a shorter or a longer distance depending on the previous experience, a database of entries or by estimating dependency on the he packet delay experienced in the opposite direction link for the same segments, etc.)

Figure 8:
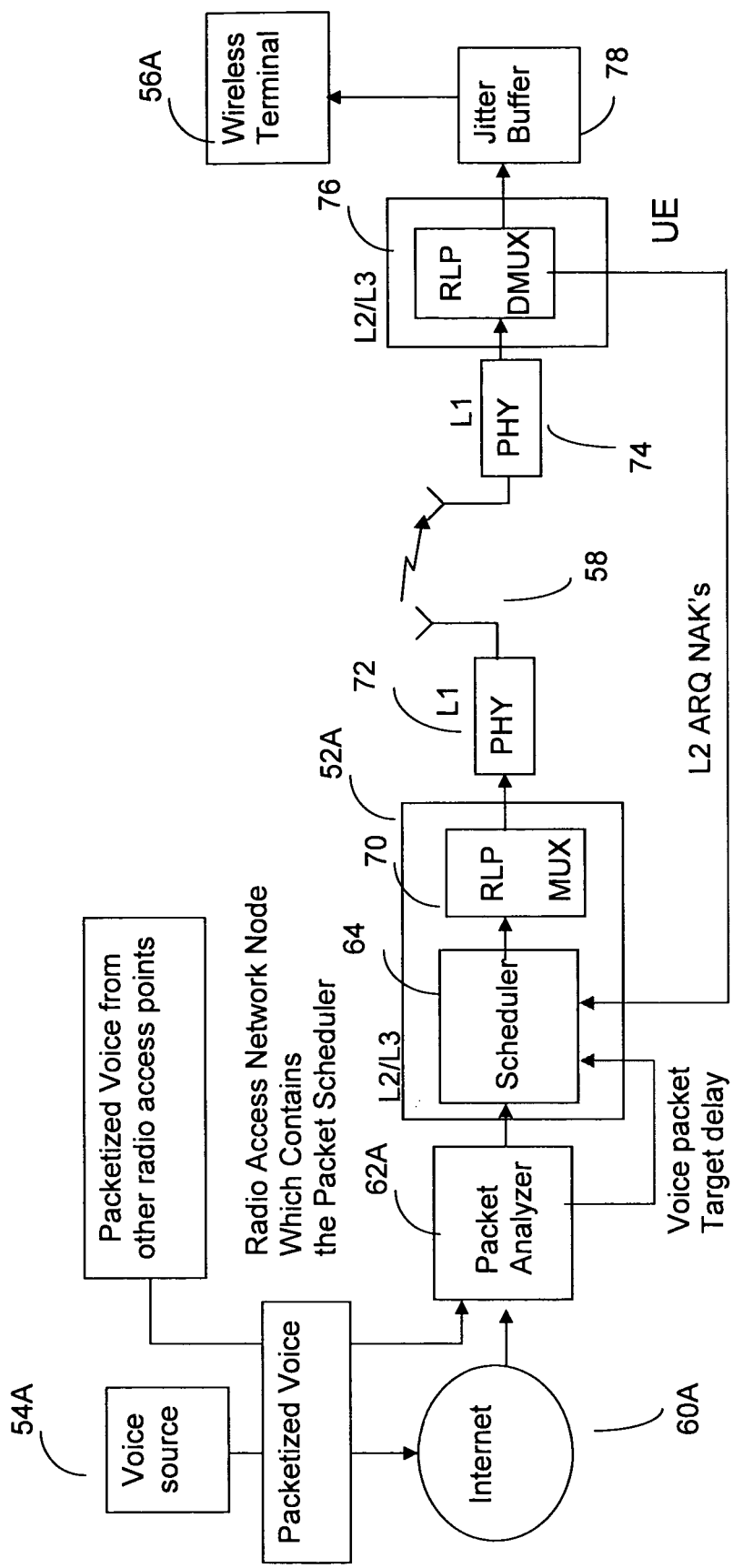
FIG. 8 illustrates an example of the commutations network system of FIG. 5.

FIG. 8 illustrates an example of the commutations network system 50 of FIG. 5. In FIG. 8, a radio access network node 52A is shown as an example of the access point 52 of FIG. 5, a voice source 54A is shown as an example of the source 54 of FIG. 5, a wireless terminal 56A of a user equipment (UE) 76 is shown as an example of the destination node 56 of FIG. 5, and Internet 60A is shown as an example of the external network 60 of FIG. 5. In FIG. 7, a packet analyzer 62A is shown as the packet analyzer 62 of FIG. 5, and is located separately from the radio access network node 52A. The voice source 54A provides packetized voice to the wireless terminal 56A through the Internet 60A and the wireless network 58.

The radio access network node 52A contains the packet scheduler 64 and a Radio Link Protocol Multiplexer (RLP Mux) 72. The voice packet target delay is calculated by the packet analyzer 62A and is provided to the scheduler 64. The scheduled packet is sent to a L1 circuit (PHY) 72. The packet is then sent to a PHY 74 through an antenna-to-antenna commutation. The user equipment 76 includes a RLP DMUX corresponding to the RLP MUX 70, which may send an ARQ NAK signal to the scheduler 64. The user equipment 76 may include a jitter buffer 78 for delivering packets in order and in regular intervals. The jitter buffer 78 may be removed from the destination side. The wireless terminal 56A receives the voice packet from the user equipment 76 or the jitter buffer 78.

In FIG. 8, voice service is provided from the voice source 54A to the wireless terminal 56A. However, stream data services other than voice, such as video, may be provided from the source 54A to the destination node 56A.

The delay budget assignment by the packet analyzer (20 of FIG. 2, 20A of FIG. 3, 62 of FIG. 5, 62A of FIG. 8) reduces jitter buffer requirements in an access point or an intermediate node in an ad-hoc network. The delay budget assignment by the packet analyzer delays packets arrived early and expedites the transmission of delayed packets. Therefore, the receiver receives the packets of a streaming service more or less regularly. This reduces the requirement of the jitter buffer (e.g., 78 of FIG. 8) in an access point or an intermediate node in an ad-hoc network, since the function of the jitter buffer is to deliver packet in regular intervals to the higher layer (application). Since some applications can tolerate certain amount of jitter, the requirement of the jitter buffer may be completely removed for those applications.

Figure 9A:
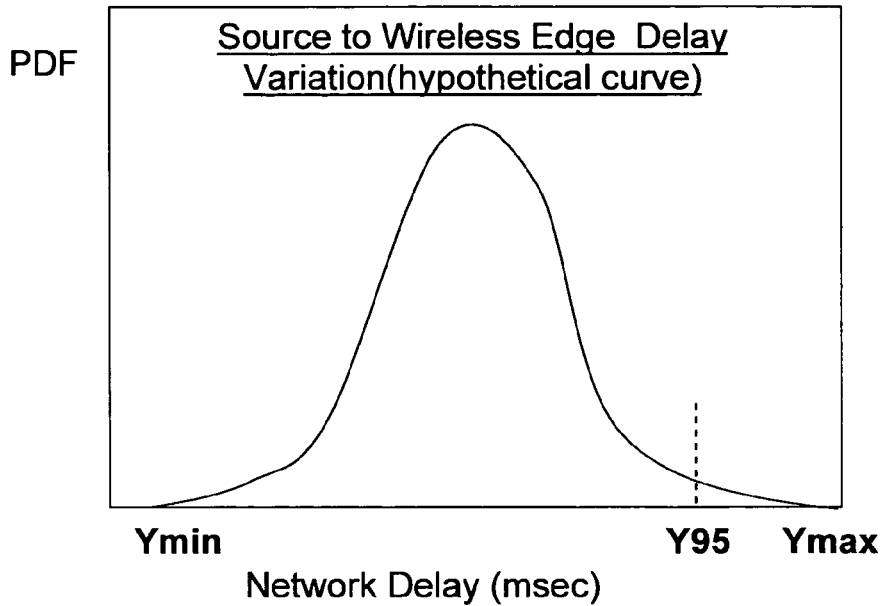
FIG. 9A illustrates a source to a wireless edge delay variation in a Mobil Broadband Wireless (MBW) system.
Figure 9B:
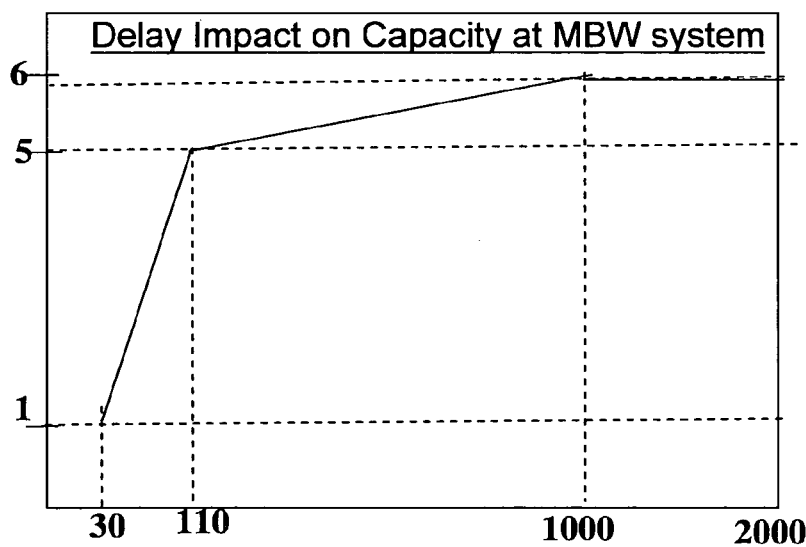
FIG. 9B illustrates a delay impact on a capacity for the MBW system.

FIG. 9A illustrates a source to a wireless edge delay variation, and FIG. 9B illustrates a delay impact on a capacity for a Mobile Broadband Wireless (MBW) system. In FIG. 9A, Ymin represents the minimum of a network delay, Ymax represents the minimum of the network delay, and Y95 represents the 95th percentile of the assessed delay distribution. Referring to FIG. 9A, Internet delay is variable. In order that 95% packets meet end-to-end delay requirement wireless budget has to be made to allow for network delay Y95. Referring to FIG. 9B, delay reduction impacts capacity significantly. Capacity is reduced by a factor of 5 when required delay is reduced from 110 msec to 30 sec. Packets requiring a lower delay take 5 times system resources compared to the packets requiring a higher delay. By contrast, according to the embodiments of the present invention, the delay budget Z is dynamically changed.

Figure 10:
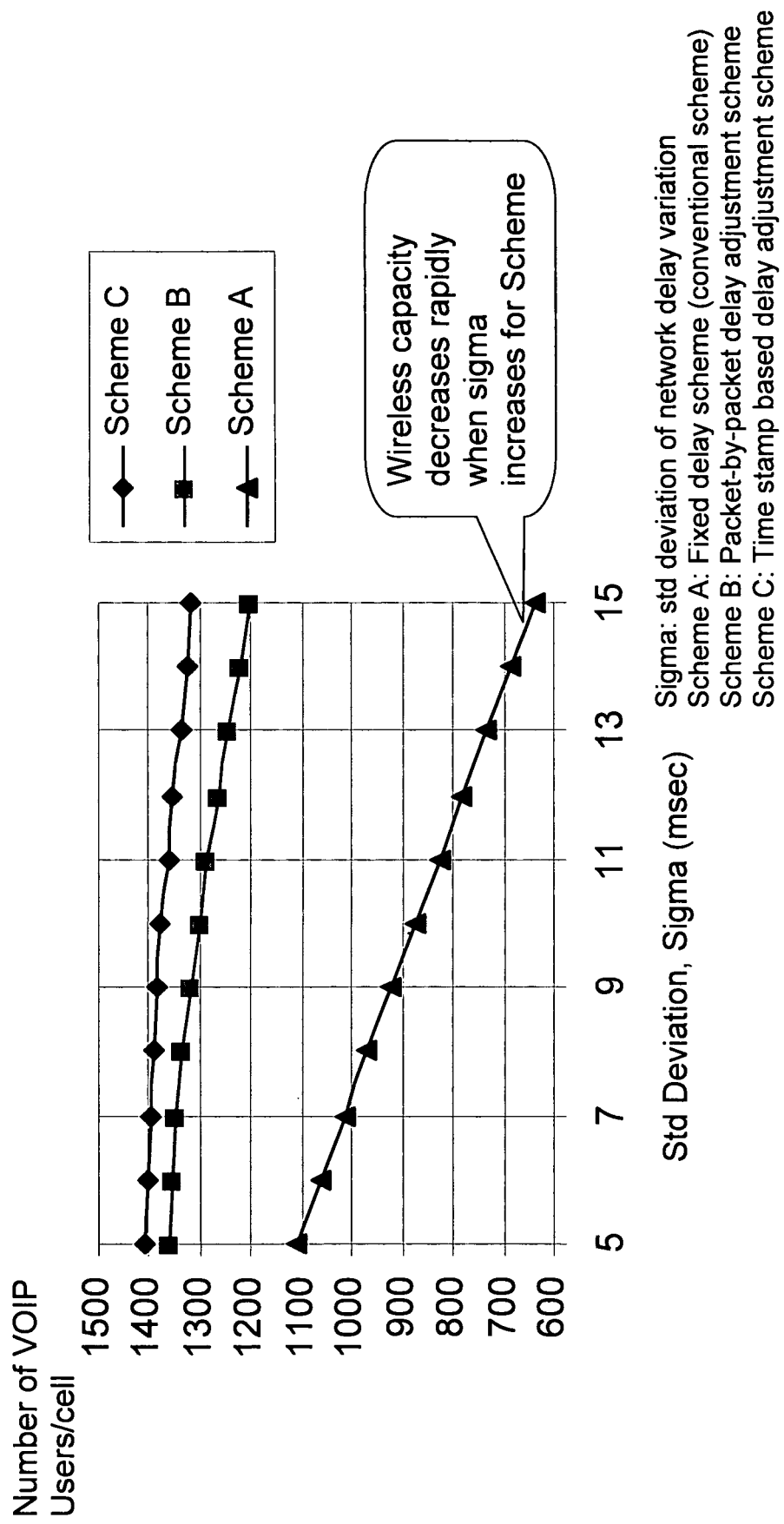
FIG. 10 illustrates performance results for several Schemes A, B and C.

FIG. 10 illustrates performance results for Scheme A, Scheme B, and Scheme C. In the description and figures, "Scheme A" refers to the conventional fixed delay budget scheme, "Scheme B" refers to the delay budget calculation scheme performed by the packet analyzer (20 of FIG. 2, 20A of FIG. 3, 62 of FIG. 5) except the time stamp based delay budget calculation scheme, "Scheme C" refers to the time stamp based delay budget calculation scheme. In the description and figures, "std" represents standard, "Sigma" represents standard deviation of network delay variation. As shown therein, Scheme B and Scheme C provide significant gains over Scheme A. Gain is large when the network delay variation is large.

FIG. 11 illustrates the performance results of FIG. 10 in a different way. In FIG. 11, the gains of Schemes B and C are shown relative to that of Scheme A. As shown in FIG. 11, significant gains over Scheme A are obtained, depending on Sigma.

Figure 12B:
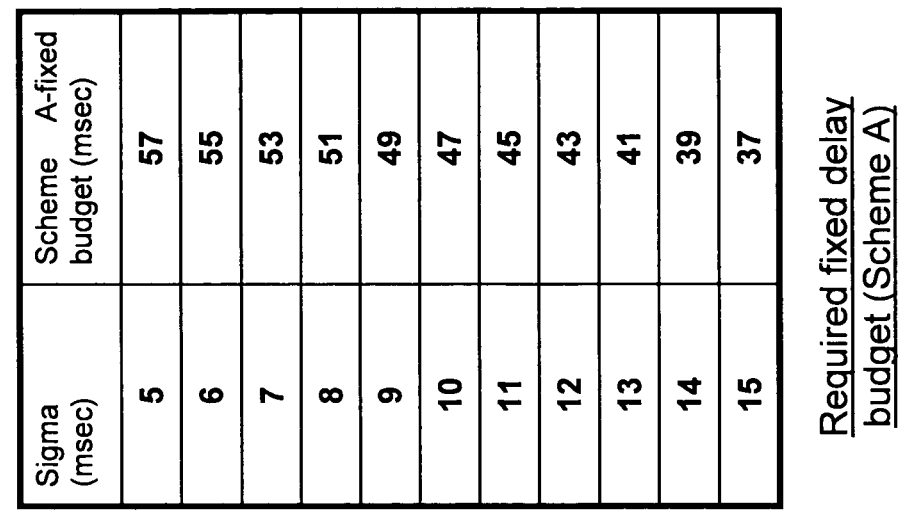
FIGS. 12A and 12B illustrate further performance results for Schemes A, B and C.
Figure 12A:
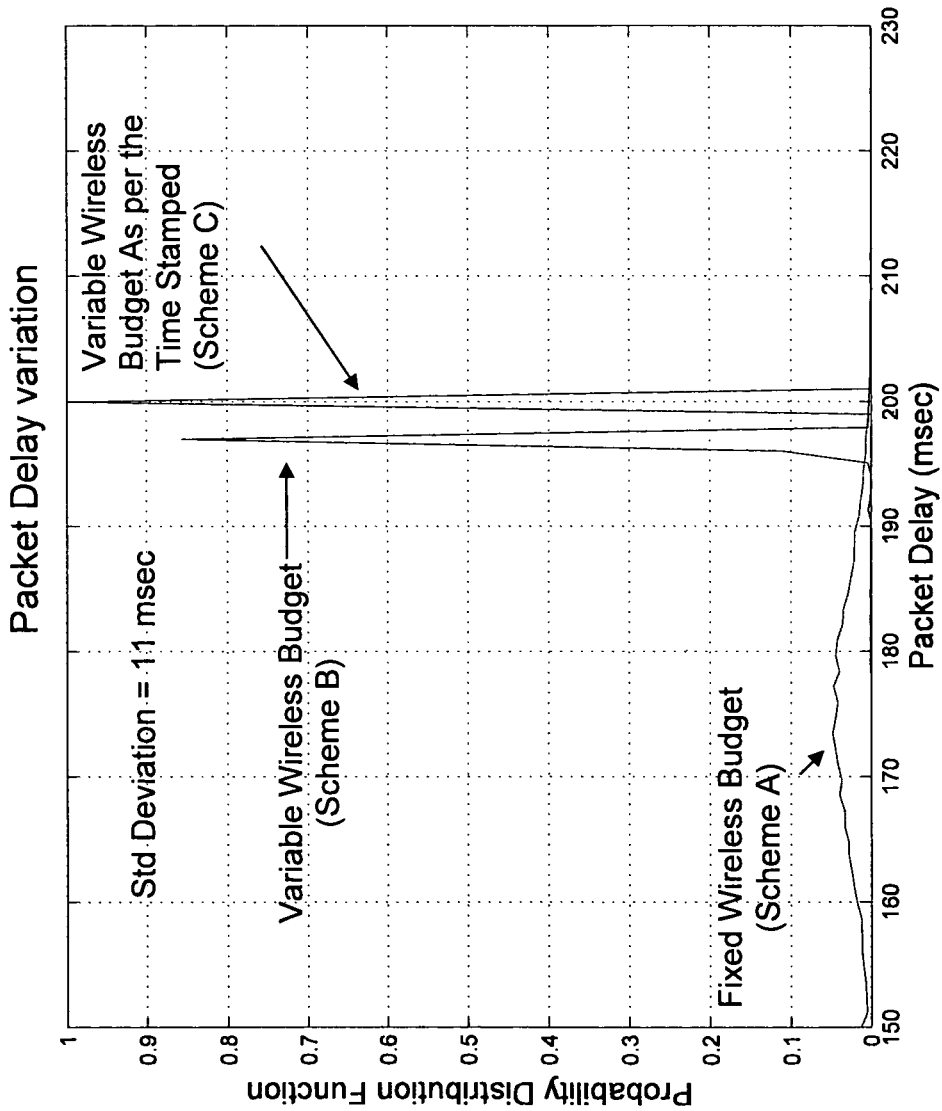

FIGS. 12A and 12B provide further performance results for Schemes A, B and C. FIG. 12A shows the end to end delay distribution experienced by the packets for different schemes assuming that scheduler provides exact delay requirements of the packets, for Sigma=11 msec. FIG. 12B summarizes, the required wireless delay budget for scheme A for different (Sigma) standard deviations. It is noted that in order to meet the outage requirement, Scheme A requires a smaller budget when Sigma is large (big capacity hit). Schemes B and C provide significant throughput gain for applications packet transmissions, such as Voice and Video.

The results in FIGS. 10 to 12B are based on an exemplary MBW system delay dependency results.

The capacity of the other systems such as 1×EVDV may have a higher dependency on the delay budget and thus larger improvements from Schemes B and C are expected.

The evaluation example using an example MBW system as described above, is as follows:

(1) For voice packets, end-to-end delay requirement is 200 msec.
    Assume, network delay varies from 50 to 100 msec. (i.e. Worst case network delay to 100 msec).
(2) Some unavoidable delays in the wireless access system, BSC (transcoding, processing)=35 msec
BTS (interleaving, buffering, processing)=10 msec
UE (modem/framing)=5 msec
total unavoidable delays=35=10+5=50 msec.

(3) The worst case delay budget available for scheduling=200−worst case network delay−unavoidable delays=50 msec.

Thus, the conventional algorithm should assign about 50 msec delay budget for all the packets to be in the safe side.

(4) However, according to the embodiments of the present invention, the packets arriving earlier (with lower network delays) can have a longer delay budget. Therefore, the scheduler (e.g., 66 of FIG. 5) is provided with more freedom to schedule. In this example, the delay budget Z may be increased from 50 to 90 msec for some packets without impacting the end-to-end delay.

The packet analyzer (20 of FIG. 2, 20A of FIG. 3, 62 of FIG. 5) may use a conservative delay assessment for initial packets. The following is an example algorithm (example X) to evaluate the delay budget using past packet information for a streaming service of which the packets are sent in regular intervals (e.g., 20 msec).

For, up to first M packets:
  Wireless budget=Nominal budget+Early arrival credit compared to the mean arrival time of the previous packets.
Up to next N-m packets:
  Wireless budget=Nominal budget+estimated sigma (using the past few packets)
Up to next 2N-m packets:
  Wireless budget=Nominal budget+K1*estimated sigma (using the past few packets)
All the other packets
  Wireless budget=Nominal budget+K2*estimated sigma (using the past few packets)

The following parameters were used in the example results shown in FIGS. 10 and 11. In these results it is assumed sigma, the standard deviation of the network delay is known. If unknown, different statistical approaches could be done to keep same percentage of packet outage.

M=2, N=50, K1=1.5−1.6, K2=1.9−2.2 (K1 and K2 is adjusted based on sigma).

Figure 13:
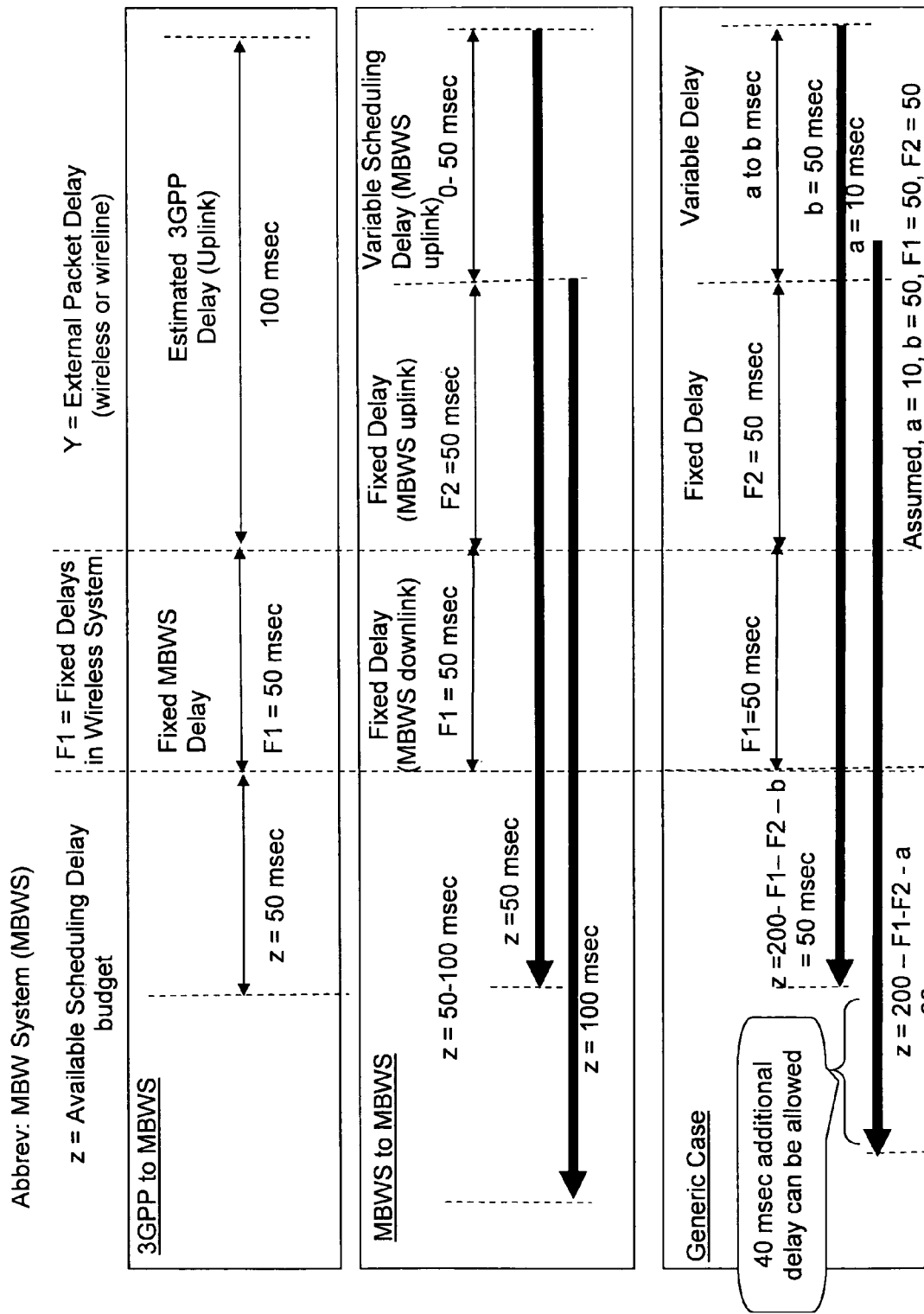
FIG. 13 illustrates examples of delay budgets for two different scenarios that can be experienced in practice and a delay budget for a generic scenario, in accordance with an embodiment of the present invention.

FIG. 13 illustrates examples of delay budgets for two different scenarios that can be experienced in practice and a delay budget for a generic scenario in accordance with an embodiment of the present invention In FIG. 13, "D" represents an end-to-end delay, "Z" represents a wireless scheduling budget, "F" represents a total fixed delay (wireless and wireline), "F1"represents a wireless fixed delay, "F2" represents a wireline (external network) fixed delay, "Y" represents a total external delay (e.g., network delay). In FIG. 13, "3GPP" represents "3rd Generation Partnership Project" and "MBWS" represents "Mobile Broadband Wireless System" which is provided as an example of a broadband wireless system.

As shown in FIG. 13, the system using the packet analyzer (20 of FIG. 2, 20A of FIG. 3, 62 of FIG. 5, 62A of FIG. 8) can allow additional delay to the packets of a data flow through a wireless network.

Figure 14:
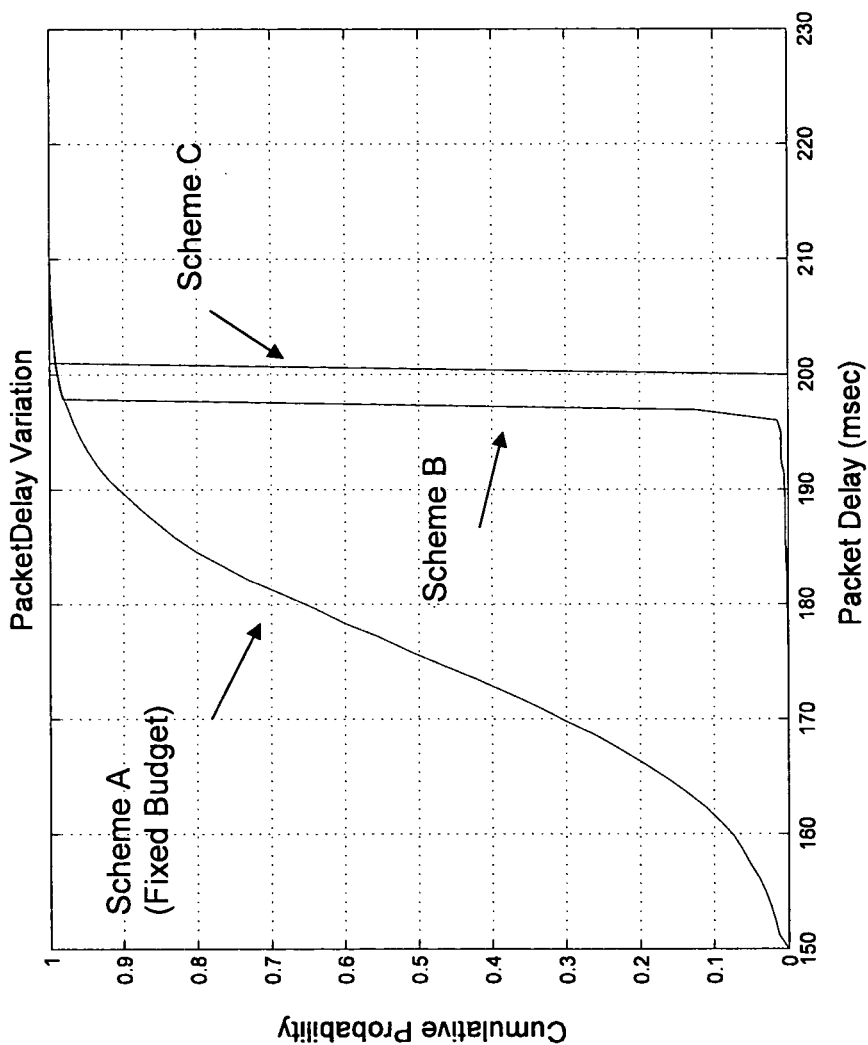
FIG. 14 illustrates further performance results for Schemes A, B and C.

FIG. 14 illustrates further performance results for Schemes A, B and C, using cumulative distribution. Schemes B and C establish delay targets so that user 2% outage requirement is met. The end-to-end delay is almost equal for all the packets. Due to scheduling delay variation which is not modeled here, the actual delay may be lower than the target delay. Therefore, a jitter buffer (e.g., 78 of FIG. 8) may be employed but the jitter buffer requirements are minimized due to lower variation in the delay and depending on the jitter tolerance level of the application. The system may be able to eliminate the jitter buffer.

Figure 1:
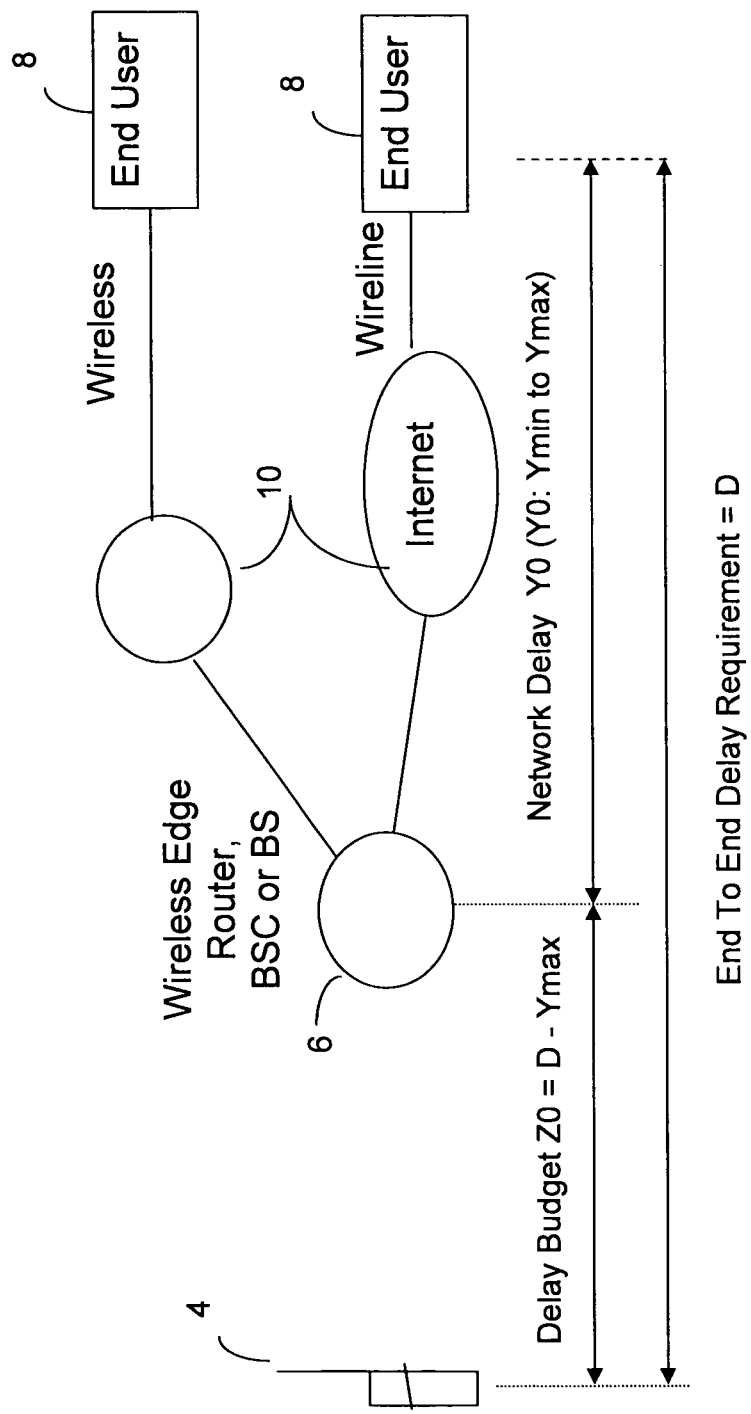
FIG. 1 illustrates a conventional communications network system which utilizes a fixed delay budget scheme.
Figure 15:
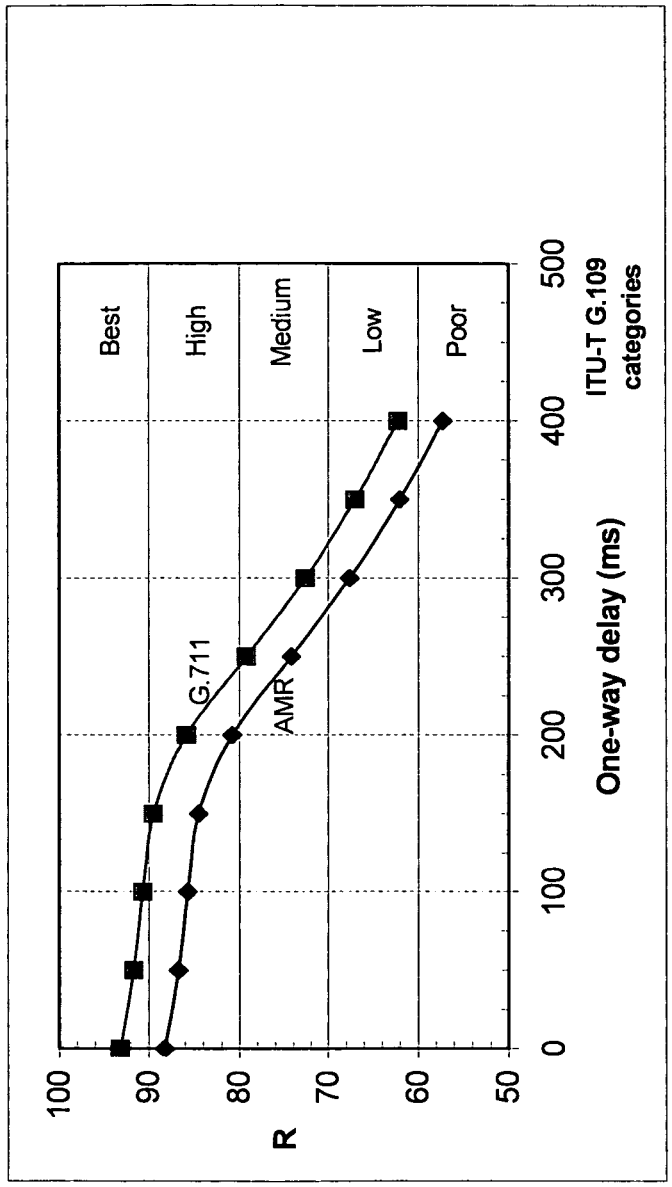
FIG. 15 illustrates delay requirements for voice packets, specified by ITU to maintain certain level of voice quality.

FIG. 15 illustrates delay requirements voice packets specified by ITU to main certain level of voice quality. As shown in FIG. 15, the delay budget is a trade-off between the voice quality and network capacity. In the conventional systems, the network delay (Y0 of FIG. 1) is set to 200 msec. By contrast, according to the embodiments of the present invention, the external delay Y and the delay budget Z are dynamically changed, which may depend on the voice quality and network capacity.

The calculation of a delay budget and the packet scheduling of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements, which may be embedded in a carrier wave may be transmitted via a communication network. Such a computer readable memory and a computer data signal and/or its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of dynamically allocating a delay budget to a packet transmitting from a source to a destination, comprising:
   at a packet analyzer between a source and a destination, receiving at least one incoming packet from the source to the destination, wherein at least one incoming packet is a regular interval packet;
   extracting information from the incoming packet, the information associating the incoming packet to at least one previously received incoming packets, wherein the information includes packet identification information associating the incoming regular packet to previously received regular interval packets;
   assessing a variable delay caused in a communication path from the source to the packet analyzer, based on an arrival time of the at least one previously received regular interval packets, wherein assessing the variable delay caused in a communication path from the source to the packet analyzer, comprises:
   sending a request for an assessment packet;
   receiving the assessment packet to assess the variable delay; and
   determining a delay budget for a downlink from the packet analyzer, based on the variable delay and an end to end delay requirement between the source and the destination; and
   outputting the incoming packet with the delay budget from the packet analyzer to a packet scheduler.

2. The method of claim 1, wherein assessing a variable delay comprises evaluating a relative interval of the regular interval packets.

3. The method of claim 1, wherein assessing a variable delay comprises estimating an arrival time distribution of the previously received incoming packets.

4. The method of claim 1, wherein assessing a variable delay comprises estimating a delay distribution of the previously received incoming packets and wherein the received incoming packets is iteratively updated each time another incoming packet is received.

5. The method of claim 1, wherein assessing a variable delay comprises estimating a delay distribution of the previously received incoming packets, and wherein determining a delay budget comprises determining the delay budget based on the delay distribution of the previously received incoming packets.

6. The method of claim 1, wherein assessing a variable delay comprises calculating an average of arrival times of the previously received incoming packets, and wherein determining a delay budget comprises determining the delay budget based on the average of arrival times of the previously received incoming packets.

7. The method of claim 1, wherein extracting comprises identifying packet identification information associating the incoming packet to at least one of a user, a service, one or more data flows or combinations thereof 8. The method of claim 7, wherein determining a delay budget comprises determining the delay budget using a delay requirement associated with the packet identification information.

9. The method of claim 7, wherein identifying comprises identifying at least two associated data flows.

10. The method of claim 9, wherein determining a delay budget comprises determining the delay budget for each associated data flow so as to synchronize the at least two associated data flows.

11. The method of claim 9, wherein the delay budget is the maximum duration the incoming packet can be delayed in one or more next forwarding nodes and associated links, until it reaches the destination, without impacting the required quality of a service.

12. The method of claim 9, further comprising at least one of the following: recording the arrival time of the incoming packet; noting the arrival time of the incoming packet; and marking the arrival time of the incoming packet.

13. A system for dynamically allocating a delay budget to a packet transmitting from a source to a destination, comprising:
an input module for receiving an incoming packet from a source to a destination wherein at least one incoming packet is a regular interval packet, and extracting information from the incoming packet, the information associating the incoming packet to arrival time data associated with previously received incoming packets, wherein the information includes packet identification information associating the incoming regular packet to previously received regular interval packets;
determining an expected arrival time of the incoming packet based at least in part on the arrival time data associated with the previously received incoming packets;
a module for assessing a delay budget for a downlink from the system in dependence upon an arrival time of the incoming packet and the associated information, including:
a first module for assessing a variable delay caused in a communication path from the source to the system, based on an arrival time of the at least one previously received regular interval packets, the first module sending a request for an assessment packet and receiving the assessment packet to assess the variable delay; and
a second module for determining the delay budget for the downlink, based on the variable delay and an end to end delay requirement between the source and the destination; and an output module for outputting the incoming packet with the delay budget to a packet scheduler.

14. The system of claim 13, wherein the output module comprises a delay budget first output module for outputting the delay budget, and a received packet second output module for outputting the incoming packet received at the input module.

15. The system of claim 13, wherein the output module comprises a module for attaching the delay budget to the incoming packet received at the input module, and outputting the incoming packet with the delay budget.

16. The system of claim 13, further comprising a repository for storing packet information for the assessment.

17. The system of claim 13, wherein the first module assesses a delay distribution of the previously received incoming packets.

18. The system of claim 17, wherein the first module estimates the delay distribution based on the arrival times of the previously received incoming packets.

19. The system of claim 17, wherein the second module iteratively determines the delay budget each time another incoming packet is received.

20. The system of claim 13, wherein the arrival time data associated with the previously received incoming packets comprises an arrival time distribution of the previously received incoming packets.

21. The system of claim 13, wherein the second module determines the delay budget for an incoming regular interval packet based on arrival times of previously received incoming regular interval packets.

22. The system of claim 13, wherein the first module calculates an average of arrival times of the previously received incoming packets, and wherein the second module determines the delay budget using the average of arrival times of the previously received incoming packets.

23. The system of claim 13, wherein the input module comprises a module for identifying packet identification information that associates the incoming packet to at least one of a user, a service, one or more data flows or combinations thereof.

24. The system of claim 13, wherein the delay budget is a delay for the incoming packet and is allowable in one or more next forwarding nodes and associated links, until it reaches the destination, without impacting the required quality of a service.

25. A non-transitory computer-readable medium storing computer executable instructions for use in the execution of a method of dynamically allocating a delay budget to a packet transmitting from a source to a destination, the method comprising:
receiving at a packet analyzer an incoming packet from a source to a destination, wherein at least one incoming packet is a regular interval packet;
extracting information from the incoming packet, the information associating the incoming packet to arrival time data associated with previously received incoming packets, wherein the information includes packet identification information associating the incoming regular packet to previously received regular interval packets;
assessing a variable delay caused in a communication path from the source to the packet analyzer, based on an arrival time of the at least one previously received regular interval packets, wherein assessing the variable delay caused in a communication path from the source to the packet analyzer, comprises:
sending a request for an assessment packet;
receiving the assessment packet to assess the variable delay;

determining an expected arrival time of the incoming packet based at least in part on the arrival time data associated with the previously received incoming packets;

determining a delay budget for a downlink to the destination, based on the variable delay and an end to end delay requirement between the source and the destination; and outputting the incoming packet with the delay budget to a packet scheduler.

26. A method of dynamically allocating a delay budget to a packet transmitting from a source to a destination, comprising:

at a packet analyzer between a source and a destination, receiving at least one incoming packet from the source to the destination, wherein at least one incoming packet is a regular interval packet;

extracting information from the incoming packet, the information associating the incoming packet to at least one previously received incoming packets, wherein the information includes packet identification information associating the incoming regular packet to previously received regular interval packets;

assessing a variable delay caused in a communication path from the source to the packet analyzer, based on an arrival time of the at least one previously received regular interval packets, wherein assessing the variable delay caused in a communication path from the source to the packet analyzer, comprises:

sending a request for an assessment packet;

receiving the assessment packet to assess the variable delay; and evaluating a relative interval of the regular interval packets; and determining a delay budget for a downlink from the packet analyzer, based on the variable delay and an end to end delay requirement between the source and the destination; and outputting the incoming packet with the delay budget from the packet analyzer to a packet scheduler.

* * * * *